United States Patent [19]

Bachl et al.

[11] Patent Number: 4,831,090

[45] Date of Patent: May 16, 1989

[54] PREPARATION OF HOMOPOLYMERS OF ETHENE AND COPOLYMERS OF ETHENE WITH HIGHER α-MONOOLEFINS USING A ZIEGLER CATALYST SYSTEM

[75] Inventors: Robert Bachl; Guido Funk, both of Worms; Konrad Richter, Ludwigshafen; Rainer Hemmerich, Gruenstadt; Roland Saive, Ludwigshafen, all of Fed. Rep. of Germany

[73] Assignee: BASF Aktiengesellschaft, Ludwigshafen, Fed. Rep. of Germany

[21] Appl. No.: 108,457

[22] Filed: Oct. 15, 1987

[51] Int. Cl.$^4$ ............... C08F 4/66; C08F 10/02
[52] U.S. Cl. ............... 526/116; 502/113; 526/114; 526/138; 526/348.6
[58] Field of Search ............... 526/116

[56] References Cited

U.S. PATENT DOCUMENTS

| | | | |
|---|---|---|---|
| 3,674,766 | 7/1972 | Mottus et al. | 526/165 |
| 3,764,591 | 10/1973 | Miyoshi et al. | 526/138 |
| 4,556,648 | 12/1985 | Kawai et al. | 526/114 |
| 4,710,552 | 12/1987 | Bachl et al. | 526/116 |

FOREIGN PATENT DOCUMENTS

| | | | |
|---|---|---|---|
| 703847 | 2/1965 | Canada | 526/138 |
| 0137224 | 4/1985 | European Pat. Off. | |
| 0166888 | 1/1986 | European Pat. Off. | |
| 2292716 | 7/1976 | France | 526/138 |
| 828201 | 2/1960 | United Kingdom | 526/153 |
| 1182651 | 3/1970 | United Kingdom | |

Primary Examiner—Edward J. Smith
Attorney, Agent, or Firm—Keil & Weinkauf

[57] ABSTRACT

Homopolymerization and copolymerization of ethene are carried out using a Ziegler catalyst system consisting of (1) a transition metal catalyst component prepared by a method in which (1.1) first (1.1.1) an inorganic oxide substance (I) as a carrier and (1.1.2) a solution (II) of (IIa) a certain oxahydrocarbon and (IIb) a mixture of (IIb1) a vanadium trichloride/alcohol complex, (IIb2) a titanium trihalide or titanium trihalide/alcohol complex and, if desired, (IIb3) a zirconium tetrahalide, are combined with formation of a suspension (III), the latter is evaporated down to form a solid-phase intermediate (IV), (1.2) then (1.2.1) the solid-phase intermediate (IV) obtained from (1.1), and (1.2.2) a dissolved organoaluminum compound (V), are combined with formation of a suspension, the resulting suspended substance being a solid-phase product (VI), (2) an organoaluminum catalyst component and (3) an organohalogen catalyst component. In this process, the transition metal catalyst component (1) used is one prepared by a method in which (1.3) in addition (1.3.1) the product (VI) obtained from (1.2) is reacted with (1.3.2) oxygen, the resulting solid-phase end product (VII) being the novel transition metal catalyst component (1).

2 Claims, No Drawings

PREPARATION OF HOMOPOLYMERS OF ETHENE AND COPOLYMERS OF ETHENE WITH HIGHER α-MONOOLEFINS USING A ZIEGLER CATALYST SYSTEM

The present invention relates to a process for the batchwise and, in particular, continuous preparation of homopolymers of ethene and, in particular, copolymers of ethene with minor amounts of $C_3$–$C_8$-α-monoolefins, in particular $C_4$–$C_6$-α-monoolefins, by polymerization of the monomer or monomers at from 30° to 200° C., in particular from 50° to 125° C., and under from 0.1 to 200, in particular from 5 to 60, bar using a Ziegler catalyst system consisting of (1) a transition metal catalyst component which is prepared by a method in which (1.1) first (1.1.1) a finely divided, porous, inorganic oxide substance (I) which has a particle diameter of from 1 to 1,000 μm, preferably from 1 to 400 μm, a pore volume of from 0.3 to 3, preferably from 1 to 2.5, cm$^3$/g and a surface area of from 100 to 1,000, preferably from 200 to 400, m$^2$/g and is of the formula $SiO_2.aAl_2O_3$, where a is from 0 to 2, in particular from 0 to 0.5, and (1.1.2) a solution (II) as obtained by combining (IIa) 100 parts by weight of a saturated aliphatic or partially saturated aliphatic and partially aromatic oxahydrocarbon which has 1 or 2 oxaoxygen atoms, preferably 1 oxaoxygen atom, and more than 3 but fewer than 19, preferably more than 3 but fewer than 11, carbon atoms, in particular a saturated aliphatic cyclic oxahydrocarbon which has 1 oxaoxygen atom and 4 to 6 carbon atoms, especially tetrahydrofuran, and (IIb) from 0.01 to 50, preferably from 1 to 30, parts by weight of a mixture of (IIb1) 100 molar parts of a vanadium trihalide/alcohol complex of the formula $VY_3.nZ$—OH, where Y is chlorine or bromine, preferably chlorine, n is from 1 to 6, preferably from 3 or 4, and Z is a monovalent saturated aliphatic or partially saturated aliphatic and partially aromatic hydrocarbon radical of not more than 10, preferably not more than 8, carbon atoms, in particular alkyl of not more than 6 carbon atoms, (IIb2) from 0.2 to 300, preferably from 0.5 to 100, molar parts of a titanium trihalide, where halogen may be chlorine and/or bromine, preferably a titanium trichloride, or a titanium trihalide/alcohol complex of the formula $TiY_3.nZ$—OH, where Y is chlorine or bromine, preferably chlorine, n is from 1 to 6, preferbly from 3 to 4, and Z is a monovalent saturated aliphatic or partially saturated aliphatic and partially aromatic hydrocarbon radical of not more than 10, preferbly not more than 8, carbon atoms, in particular alkyl of not more than 4 carbon atoms, and (IIb3) if desired, but advantageously, from 1 to 400, preferably from 3 to 200, molar parts of a zirconium tetrahalide, where halogen may be chlorine and/or bromine, preferably a zirconium tetrachloride, are brought into contact with one another with formation of a suspension (III), with the proviso that the weight ratio of inorganic oxide substance (I) to transition metal composition (IIb) is from 1:0.01 to 1:2, preferably from 1:0.2 to 1:1.5, and the suspension (III) is evaporated to dryness at below 200° C., preferably below 160° C., and above the melting point of the oxahydrocarbon (IIa) used, with formation of a solid-phase intermediate (IV), and (1.2) then (1.2.1) the solid-phase intermediate (IV) obtained from stage (1.1) and (1.2.2) an aluminum compound (V) which is dissolved in an organic solvent and is of the formula $AlR_mX_{3-m}$, where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is from 1 to 3, preferably 2, are brought into contact with one another with formation of a suspension, with the proviso that the weight ratio of solid-phase intermediate (IV) to aluminium compound (V) is from 1:5.05 to 1:2, preferably from 1:0.1 to 1:1, the resulting suspended substance being a solid-phase product (VI), (2) an organoaluminum catalyst component of the formula $AlR_mX_{3-m}$, where X is a radical OR, chlorine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is from 1 to 3, preferably from 2 to 3, and (3) an organohalogen catalyst component (=cocatalyst), with the provisos that the atomic ratio of the transition metal from the catalyst component (1) to aluminum from the catalyst component (2) is from 1:0.1 to 1:500, preferably from 1:0.2 to 1:50, and the molar ratio of organoaluminum catalyst component (2) to organohalogen catalyst component (3) is from 1:0.001 to 1:50, preferably from 1:0.01 to 1:10.

Polymerization processes of this type are known, and the polymerization process described in European Laid-Open Application No. 0,166,888 (=U.S. Ser. No. 666,480) may be considered typical in the present context.

Although the Ziegler catalyst system described there makes it possible to prepare polymers having good particle properties and a molecular weight distribution which can be adjusted in a controlled manner, molecular weight regulation being carried out efficiently with hydrogen, the productivity of the catalyst system and the residual chlorine contents of the polymers are still unsatisfactory.

On the other hand, British Pat. No. 1,182,651 and U.S. Pat. No. 3,674,766 diclose that the productivity of catalyst systems based on vanadium can be increased by reaction with small amounts of oxygen. Controlled adjustment of the molecular weight distribution in width and shape is however impossible with the systems described there.

European Laid-Open Application No. 0,137,224 describes the use of oxygen for increasing the productivity and influencing the molecular weight distribution for a transition metal catalyst component essentially containing titanium and zirconium. However, the examples given there show that the molecular weights cannot be adquately regulated with hydrogen and the molecular weight distribution is not satisfactoryili controlled, since the broader distributions are obtained exclusively in conjunction with unsatisfactory productivities.

It is an object of the present invention to provide a novel type of catalyst system which, compared with the known systems, permits the preparation of polymers having good particle properties and a molecular weight distribution which can be optimally controlled in width and shape, while at the same time giving high productivity and enabling the molecular weights to be regulated with hydrogen.

We have found that this object is achieved using a catalyst system of the type defined at the outset if its transition metal catalyst component (1) is one prepared by a method in which the solid-phase product (VI) obtained from stage (1.2) is additionally reacted with oxygen, the resulting solid-phase end product (VII) being the catalyst component (1).

The present invention accordingly relates to a process for the batchwise and, in particular, continuous preparation of homopolymers of ethene and, in particular, copolymers of ethene with minor amounts of $C_3$–$C_8$-α-monoolefins, in particular $c_4$–$C_6$-α-monoolefins, by polymerization of the monomer or monomers at from 30° to 200° C., in particular from 50° to 125° C., and under from 0.1 to 200, in particular from 5 to 60, bar using a Ziegler catalyst system consisting of (1) a transition metal catalyst component which is prepared by a method in which (1.1) first (1.1.1) a finely divided, porous, inorganic oxide substance (I) which has a particle diameter of from 1 to 1,000 μm, preferably from 1 to 400 μm, a pore volume of from 0.3 to 3, preferably from 1 to 2.5, cm$^3$/g and a surface area of from 100 to 1,000, preferably from 200 to 400, m$^2$/g and is of the formula $SiO_2.aAl_2O_3$, where a is from 0 to 2, in particular from 0 to 0.5, and (1.1.2) a solution (II) as obtained by combining (IIa) 100 parts by weight of a saturated aliphatic or partially saturated aliphatic and partially aromatic oxahydrocarbon which has 1 or 2 oxaoxygen atoms, preferably 1 oxaoxygen atom, and more than 3 but fewer than 19, preferably more than 3 but fewer than 11, carbon atoms, in particular a saturated aliphatic cyclic oxahydrocarbon which has 1 oxaoxygen atom and 4 to 6 carbon atoms, especially tetrahydrofuran, and (IIb) from 0.01 to 50, preferably from 1 to 30, parts by weight of a mixture of (IIb1) 100 molar parts of a vanadium trihalide/alcohol complex of the formula $VY_3.nZ$—OH, where Y is chlorine or bromine, preferably chlorine, n is from 1 to 6, preferably from 3 or 4, and Z is a monovalent saturated aliphatic or partially saturated aliphatic and partially aromatic hydrocarbon radical of not more than 10, preferably not more than 8, carbon atoms, in particular alkyl of not more than 6 carbon atoms, (IIb2) from 0.2 to 300, preferably from 0.5 to 100, molar parts of a titanium trihalide, where halogen may be chlorine and/or bromine, preferably a titanium trichloride, or of a titanium trihalide/alcohol complex of the formula $TiY_3.nZ$—OH, where Y is chlorine or bromine, preferably chlorine, n is from 1 to 6, preferably from 3 to 4, and Z is a monovalent saturated aliphatic or partially saturated aliphatic and partially aromatic hydrocarbon radical of not more than 10, preferably not more than 8, carbon atoms, in particular alkyl of not more than 4 carbon atoms, and (IIb3) if desired, but advantageously, from 1 to 400, preferably from 3 to 200, molar parts of a zirconium tetrahalide, where halogen may be chlorine and/or bromine, preferably a zirconium tetrachloride, are brought into contact with one another with formation of a suspension (III), with the proviso that the weight ratio of inorganic oxide substance (I) to transition metal composition (IIb) is from 1:0.01 to 1:2, preferably from 1:0.2 to 1:1.5, and the suspension (III) is evaporated to dryness at below 200° C., preferably below 160° C., and above the melting point of the oxahydrocarbon (IIa) used, with formation of a solid-phase intermediate (IV), and (1.2) then (1.2.1) the solid-phase intermediate (IV) obtained from stage (1.1) and (1.2.2) an aluminum compound (V) which is dissolved in an organic solvent and is of the formula $AlR_mX_{3-m}$, where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is from 1 to 3, preferably 2, are brought into contact with one another with formation of a suspension, with the proviso that the weight ratio of solid-phase intermediate (IV) to aluminum compound (V) is from 1:0.05 to 1:2, preferably from 1:0.1 to 1:1, the resulting suspended substance being a solid-phase product (VI), (2) an organoaluminum catalyst component of the formula $AlR_mX_{3-m}$, where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is from 1 to 3, preferably from 2 to 3, and (3) an organohalogen catalyst component (=cocatalyst), with the provisos that the atomic ratio of the transition metal from the catalyst component (1) to aluminum from the catalyst component (2) is from 1:0.1 to 1:500, preferably from 1:0.2 to 1:50, and the molar ratio of organoaluminum catalyst component (2) to organohalogen catalyst component (3) is from 1:0.001 to 1:50, preferably from 1:0.01 to 1:10.

In the novel process, the transition metal catalyst component (1) used is one prepared by a method in which (1.3) in addition (1.3.1) the solid-phase product (VI) which is obtained from stage (1.2) and if desired, but advantageously, is suspended in an inert hydrocarbon and (1.3.2) oxygen are brought into contact with one another at from −25° to 100° C., in particular from 0° to 50° C., for from 5 to 500, in particular from 30 to 300, minutes, with the proviso that the atomic ratio of transition metal from the product (VI) to oxygen is from 1:0.01 to 1:10, in particular from 1:0.05 to 1:1, the resulting solid-phase end product (VII) being the transition metal catalyst component (1).

Regarding the novel process, the following may be stated by way of explanation.

Provided that the defining features are taken into account, the polymerization process as such can be carried out in virtually any relevant conventional technological embodiments, for example as a suspension polymerization or dry phase polymerization process. The stated technological embodiments, ie. the technological variants of the polymerization of olefins by the Ziegler method, are well known from the literature and in practice, so that no further description is necessary. All that need be stated is that, in the novel process, the components of the catalyst system can be introduced into the polymerization space in a wide variety of ways, for example (i) the transition metal component (1), the organoaluminum component (2) and the organohalogen component (3) altogether at one point, (ii) the same three components all at different points, (iii) the transition metal component (1) on the one hand and a mixture of (2) and (3) on the other hand at different points, which may be particularly advantageous, or (iiii) a mixture of the transition metal component (1) and the organohalogen component (3) on the one hand and the organoaluminum component (2) on the other hand at different points.

The novel process, which is preferably carried out by a continuous procedure, is useful for the preparation of homopolymers of ethene, but mainly copolymers of ethene with minor amounts of $C_3$-$C_8$-$\alpha$-monoolefins, in particular $C_4$-$C_6$-$\alpha$-monoolefins; the latter may be present in the form of individual compounds or mixtures of two or more individual compounds. Examples of $\alpha$-monoolefins which are suitable for the copolymerization are propene, n-but-1-ene, n-pent-1-ene, n-hex-1-ene, 4-methylpentene, n-hept-1-ene and n-oct-1-ene, the best polymers being obtainable once again with n-but-1-ene, n-hex-1-ene and 4-methylpent-1-ene (or mixtures of these $\alpha$-monoolefins), in particular polymers which contain from 0.1 to 10 copolymerized molar units of the higher $\alpha$-monoolefin or of the higher $\alpha$-monoolefins per 100 molar units of ethene.

The molecular weights of the polymers may be regulated in the relevant conventional manner, in particular using hydrogen as a regulator.

Regarding the transition metal catalyst component (1) to be used in the novel process, the following may be stated specifically.

It is prepared in three stages, which are designated above and below by (1.1), (1.2) and (1.3).

In stage (1.1), a finely divided inorganic oxide substance (I) of the type defined above and a certain solution (II) defined above are brought into contact with one another to give a suspension (III), which is evaporated to dryness with formation of a solid-phase intermediate (IV). In stage (1.2), the latter is brought into contact with a solutin of a certain aluminum compound (V) defined above, with formation of a further suspension, the suspended substance being a solid-phase product (VI). In stage (1.3), the latter, in suspended or isolated form, is then reacted with oxygen, the resulting solid-phase end product (VII) being the novel transition metal catalyst component (1).

Specifically, the following procedure may be adopted:

Stage (1.1)

The inorganic oxide substance (I), as such or suspended in an oxahydrocarbon (advantageously an oxahydrocarbon as defined under (IIa), the solids content of the suspension being not less than 5% by weight), is combined with the solution (II) and the suspension (III) formed is then evaporated down.

The solution (II) itself can be prepared in the manner usually employed for solutions and in this respect has no special features.

As a final measure in stage (1.1), the suspension (III) is evaporated to dryness, the solid-phase intermediate (IV) being obtained. This can be done using a procedure conventionally employed for evaporating down suspensions under mild conditions, while maintaining the temperature conditions stated above. This means that it is generally advantageous, and in the case of relatively high oxahydrocarbons (IIa) may be indispensible, to carry out the evaporation under more or less greatly reduced pressure. As a rule of thumb, the temperature/pressure combination should be chosen so that the evaporation process is complete after about 1–10 hours. It is also advantageous to carry out the evaporation while constantly ensuring the homogeneity of the material being treated; for example, a rotary evaporator has proven useful for this purpose. Any residual amount of oxahydrocarbon, for example an amount bound by complex formation, does not generally have an adverse effect on the solid-phase intermediate (IV).

Stage (1.2)

A 0.1–50, preferably about 25, % strength by weight suspension of the solid-phase intermediate (IV) and a 5–80, preferably about 20, % strength by weight solution of the aluminum compound (V) are first prepared in separate vessels, particularly suitable suspending agents or solvents being hydrocarbons, especially relatively low boiling alkanehydrocarbons, such as hexanes, heptanes or gasolines. The suspension and the solution are then combined in proportions such that the desired weight rate is obtained. The solution is generally combined with the suspension by introducing it into the stirred suspension, since this procedure is more practical than the reverse one, which is also possible. Formation of the solid-phase product (VI), which is obtained as a suspended substance, is complete in the course of from 15 to 600, in particular from 60 to 300, minutes at from $-25°$ to $120°$ C., in particular from $25°$ to $80°$ C.

Stage (1.3)

The solid-phase product (VI) is reacted with oxygen in the desired ratios, in the absence, or preferably, presence of a suspending agent, once again a suspending agent of the abovementioned type (eg. hexanes, heptanes or gasolines) and in the abovementioned amount, and it is also possible directly to use the suspension obtained in stage (1.2). The reaction is advantageously carried out in from 0.1 to 50, preferably about 25, % strength by weight suspension with stirring at temperatures which, within the abovementioned general conditions, may be up to the boiling point of the particular suspending agent; the reaction can, in particular, be carried out at room temperature. The oxygen can be used in pure form or as a mixture with an inert gas, such as nitrogen, helium or argon. The rate of introduction and/or the dilution with an inert gas should be regulated so that the heat or reaction can easily be removed. This procedure gives the solid-phase end product (VII).

This can be used as the transition metal catalyst component (1), advantageously directly in the form of the resulting suspension, if necessary after washing by digestion or filtration. If desired, it is also possible to isolate the solid-phase product (VII) before using it as catalyst component (1). Isolation may be effected, for example, in the following manner: the product (VII) is separated from the liquid phase by filtration and is washed with pure liquid (for example a liquid of the type also used as a suspending agent or solvent), after which it is dried, for example under reduced pressure.

Regarding the composition of the transition metal catalyst component (1), the following may be stated specifically.

The inorganic oxide substance (1) to be used in stage (1.17 is in general an aluminosilicate or, in particular, a silica; it is important that it has the required properties. We have found that the commercial relevant conventional carriers which meet the stated specification are suitable.

The solvent (IIa) to be used is a saturated aliphatic or partially saturated aliphatic and partially aromatic oxahydrocarbon of 1 or 2 oxaoxygen atoms, preferably 1 oxaoxygen atom, and more than 3 but fewer than 19, preferably more than 3 but fewer than 11, carbon atoms, in particular a saturated aliphatic cyclic oxahydrocarbon which has 1 oxaoxygen atom and 4 to 6 carbon atoms, especially tetrahydrofuran. In addition to the lastmentioned compound, examples of other suitable oxahydrocarbons, taking into account the order stated above, are ethylene glycol dimethyl ether, anisole, tetrahydropyran and dioxane. The oxahydrocarbons can be used in the form of individual compounds or as mixtures of two or more individual compounds.

The vanadium trihalide/alcohol complex (IIb1) to be used is of the formula $VY_3 \cdot nZ$—OH, where Y is chlorine or bromine, preferably chlorine, n is from 1 to 6, preferably from 3 to 4, and Z is a monovalent saturated aliphatic or partially saturated aliphatic and partially aromatic hydrocarbon radical of not more than 10, preferably not more than 8, carbon atoms, in particular alkyl of not more than 6 carbon atoms. The parent vanadium trihalide may be one which is conventionally used in Ziegler catalyst systems. Suitable alcohol components are, for example, methanol, ethanol, propan-2-ol, butan-2-ol and 2-methylbutan-2-ol, the order stated above being taken into account. Complexes can be prepared by a conventional method, for example advantageously in situ, eg. from vanadium trichloride and propan-2-ol in tetrahydrofuran as a solvent, for example according to D. G. Bradley and M. L. Mehta, Can. J. Chem. 40 (1962), 1710–1713; they too can be used in the form of individual compounds or as mixtures of two or more individual compounds.

The titanium trihalide (IIb2) to be used can in turn be one which is conventionally used in Ziegler catalyst systems, for example a reaction product obtained in the reduction of a titanium tetrahalide with hydrogen, aluminum or an organoaluminum compound. For example, trichlorides of the formula $TiCl_3$, as obtained in the reduction of titanium tetrachloride with hydrogen, and trichlorides of the formula $TiCl_3 \cdot \frac{1}{3}AlCl_3$, as obtained in the reduction of titanium tetrachloride with metallic aluminum, have proven particularly useful. Alternatively, a titanium trihalide/alcohol complex of the type defined at the outset can be used; the same applies in general terms to this complex as stated for the vanadium trihalide/alcohol complex (IIb1). The titanium trihalides and titanium trichloride/alcohol complexes can be used in the form of individual compounds or as mixtures of two or more individual compounds.

The zirconium tetrahalide (IIb3) which may also be employed can likewise be one which is conventionally used in Ziegler catalyst systems.

The aluminum compound (V) to be used in stage (1.2) can be, for example, a compound of the formula $Al(C_2H_5)_3$, $Al(C_2H_5)_2Cl$, $Al(C_2H_5)_2Br$, $Al(C_2H_5)_{1.5}Cl_{1.5}$, $Al(C_2H_5)_{1.5}Br_{1.5}$, $Al(C_2H_5)Cl_2$, $Al(C_2H_5)Br_2$, $Al(C_4H_9)_3$, $Al(C_4H_9)_2Cl$, $Al(C_4H_9)Cl_2$, $Al(C_2H_5)_2H$, $Al(C_4H_9)_2H$, $Al(C_3H_7)_2(OC_3H_7)$ or $Al(C_2H_5)_{1.5}(OC_2H_5)_{1.5}$ or isoprenylaluminum. We have found that aluminum compounds of the formula $C_2H_5AlCl_2$ or $(C_2H_5)_2AlCl$ and isoprenylaluminum are particularly suitable. The aluminum compounds (V) can be used in the form of individual compounds or as mixtures of two or more individual compounds.

The oxygen to be used in stage (1.3) can be employed as such or as a mixture with an inert gas, such as nitrogen, helium or argon, ie. diluted, for example in the form of air. Ozone is also suitable. It is important that the gas used has been carefully freed from moisture.

Regarding the organoaluminum catalyst component (2), it may be stated that the relevant conventional compounds are suitable for this purpose; examples of useful individual compounds are those of the formula $Al(C_2H_5)_3$, $Al(i-C_4H_9)_3$, $Al(n-C_4H_9)_3$ or $Al(C_9H_{17})_3$ and isoprenylaluminum.

Finally, an advantageously used organohalogen catalyst component (3) is a compound from the following classes:

(A) Saturated aliphatic halohydrocarbons, suitable individual compounds being those of the formulae $CCl_4$, $CHCl_3$, $CH_2Cl_2$, $CFCl_3$, $CF_2Cl_2$ and $CF_3Cl$. Particularly suitable among these are $CCl_4$, $CHCl_3$, $CH_2Cl_2$ and $CF_2Cl_2$, while $CFCl_3$ is very suitable.

(B) Olefinically unsaturated aliphatic halohydrocarbons, suitable individual compounds being those of the formulae $CH_2=CHCl$, $CH_2=CCl_2$, $CHCl=CCl_2$, $Cl_2C=CCl_2$, $CH_2=CH-CH_2Cl$ and $CCl_2=CCl-CCl_3$. Particularly suitable among these are $CH_2=CHCl$ and $CH_2=CCl_2$, while $CH_2=CH-CH_2Cl$ and $CCl_2=CCl-CCl_3$ are very suitable.

(C) Acetylenically unsaturated aliphatic halohydrocarbons, suitable individual compounds being those of the formulae $CH\equiv C-CH_2Cl$ and $C_2H_5-C\equiv C-CH_2Cl$, $CH\equiv C-CH_2Cl$ being particularly suitable.

(D) Aromatic halohydrocarbons, suitable individual compounds being α-chlorotoluene, α,α-dichlorotoluene, α,α,α-trichlorotoluene, diphenylchloromethane, diphenyldichloromethane and triphenylchloromethane. Particularly suitable among these are α-chlorotoluene, α,α-dichlorotoluene and α,α,α-trichlorotoluene.

(E) Olefinically unsaturated aliphatic halogenated carboxylates, suitable individual compounds being methyl 2,3,4,4-tetrachlorobut-2-enoate, ethyl 2,3,4,4-tetrachlorobut-2-enoate, n-butyl 2,3,4,4-tetrachlorobut-2-enoate, methyl perchlorocrotonate and ethyl perchlorocrotonate. Methyl perchlorocrotonate and n-butyl 2,3,4,4-tetrachlorobut-2-enoate are noteworthy among these.

We have found that compounds of the classes (A), (B) and (C), followed by (D) and finally (E), are most suitable among the stated classes of compounds for the purpose according to the invention. The relevant compounds can be used individually or as mixtures of two or more individual compounds.

EXAMPLE

Preparation of the transition metal catalyst component (1):

The starting materials used were (1.1.1) 25.0 parts by weight of silica ($SiO_2$, particle diameter 90–150 μm, pore volume 1.7 cm$^3$/g, surface area 320 m$^2$/g) and (1.1.2) a solution of 100 parts by weight of tetrahydrofuran and 12.5 parts by weight of a transition metal composition, consisting of 100 molar parts of a vanadium trihalide/alcohol complex of the formula $VCl_3 \cdot 4ZOH$, where Z is isopropyl, 4.0 molar parts of a titanium trihalide of the formula $TiCl_3 \cdot \frac{1}{3}AlCl_3$ and 4.0 molar parts of zirconium tetrachloride. These two components were combined, and the resulting suspension was stirred for a short time. Thereafter, the solid-phase intermediate (IV) formed was isolated by expelling the volatile components in a rotary evaporator, which was brought to an operating pressure of 10 mbar and an operating temperature of 70° C.

Stage (1.2)

20 parts by weight of the solid-phase intermediate (IV) obtained in stage (1.1) were suspended in 103 parts by weight of n-heptane, after which a solution of 8 parts by weight of diethylaluminum chloride in 17 parts by weight of n-heptane was added to this suspension, and the resulting suspension was stirred for a short time at 65° C. The suspension was then filtered, washed three times with n-heptane and dried under reduced pressure. Analysis of the resulting solid-phase product (VI) indicated a vanadium content of 7.0% by weight and a chlorine content of 17.0% by weight.

Stage (1.3)

0.21 part by weight of the solid-phase intermediate (VI) obtained in stage (1.2) was suspended in 20 parts by weight of n-heptane, after which the suspension was introduced into an evacuated vessel, 10 ml of dry air were fed in and the vessel was shaken for 60 minutes at room temperature; the atomic ratio of transition metal from the product (VI) to oxygen was about 1:0.1. The resulting solid-phase end product (VII), ie. the catalyst component (1), was used in the suspension obtained, without isolation, for the polymerization.

Polymerization

A 10 l autoclave was charged with 5 l of isobutane, 0.1 l of but-1-ene, the suspension of the catalyst component (1), which suspension was prepared as described above, and 5 millimoles of triisobutylaluminum as catalyst component (2) and 5 millimoles of trichlorofluoromethane as the organohalogen catalyst component (3) (corresponding to an atomic ratio of transition metals from the catalyst component (1) to aluminum from the catalyst component (2) of 1:16 and a molar ratio of organoaluminum catalyst component (2) to organohalogen catalyst component (3) of 1:1). Polymerization was then effected in the course of 90 minutes with stirring and using the following parameters, each of which was kept constant by controlling them: ethene partial pressure 16.5 bar, hydrogen partial pressure 1.0 bar, temperature 80° C.; thereafter, the polymerization was terminated by lettering down the pressure.

The Table below gives further data on the copolymer obtained.

COMPARATIVE EXAMPLE

The procedure described in the above Example was followed, with the only exception that, in the polymerization, the transition metal component (1) was replaced with the same number of parts by weight of the solid-phase product (VI) obtained in the course of preparing this component in stage (1.2).

Once again, the Table below gives further data on the copolymer obtained.

molecular weight distribution and the particle properties of the polymers.

We claim:

1. A process for the preparation of homopolymers of ethene and copolymers of ethene with minor amounts of $C_3$–$C_8$-α-monoolefins by polymerization of the monomer or monomers at from 30° to 200° C. and under from 0.1 to 200 bar using a Ziegler catalyst system consisting essentially of (1) a transition metal catalyst component which is prepared by a method in which (1.1) first (1.1.1) a finely divided, porous inorganic oxide substance (I) which has a particle diameter of from 1 to 1,000 μm, a pore volume of from 0.3 to 3 cm$^3$/g and a surface area of from 100 to 1,000 m$^2$/g and is of the formula $SiO_2$.—$aAl_2O_3$, where a is from 0 to 2, and (1.1.2) a solution (II), as obtained by combining (IIa) 100 parts by weight of a saturated aliphatic or partially saturated aliphatic and partially aromatic oxahydrocarbon which has of 1 or 2 oxaoxygen atoms and more than 3 but less than 19 carbon atoms, and (IIb) from 0.01 to 50 parts by weight of a mixture of (IIb1) 100 molar parts of a vanadium trihalide/alcohol complex of the formula $VY_3.nZ$—OH, where Y is chlorine or bromine, n is from 1 to 6 and Z is a monovalent saturated aliphatic or partially saturated aliphatic and partially aromatic hydrocarbon radical of not more than 10 carbon atoms and, (IIb2) from 0.2 to 300 molar parts of a titanium trihalide, where halogen may be chlorine and/or bromine, or of a titanium trihalide complex of the formula $TiY_3.nZ$—OH, where Y is chlorine or bromine, n is from 1 to 6 and Z is a monovalent saturated aliphatic or partially saturated aliphatic and partially aromatic hydrocarbon radical of not more than 10 carbon atoms, are brought into contact with one another with formation of the a suspension (III), with the proviso that the weight ratio of inorganic oxide substance (I) to transition metal composition (IIb) is from 1:0.01 to 1:2, and the suspension (III) is evaporated to dryness at below 200° C. and above the melting point of the oxahydrocarbon (IIa) used, with formation of a solid-phase intermediate (IV), and (1.2) then

TABLE

| | Yield | | Cl in pol. | HLMI[1] | [η][2] | | | | SD | Sieve analysis[4] [% by wt.] [mm] | | | |
|---|---|---|---|---|---|---|---|---|---|---|---|---|---|
| | [g] | [g/g of cat.] | [ppm] | [g/10'] | [dl/g] | $\overline{M}_w$[3] | $\overline{M}_n$[3] | $\overline{M}_w/\overline{M}_n = Q$ | [g/l] | <0.125 | <0.25 | <0.5 | >2.0 |
| Example | 3280 | 15 620 | 11 | 3.34 | 4.45 | 559,580 | 25 360 | 22.1 | 405 | 0.1 | 0.4 | 3.1 | 0.3 |
| Comparative Example | 1540 | 7 320 | 23 | 11.15 | 3.46 | 380 330 | 18 800 | 20.2 | 416 | 0.6 | 0.9 | 7.4 | 0.6 |

[1]Determined according to DIN 53,735, 190° C., 21.6 kp load
[2]Determined according to DIN 53,728
[3]Determined by gel permeation chromatography
[4]Determined according to DIN 53,477

As shown in the Table, the invention results in the productivity being roughly doubled and the residual chlorine content in the polymer being reduced to about a half. Although this causes a slight deterioration in the regulatability with $H_2$, it is still excellent in view of the ethene and $H_2$ partial pressures. Finally, the productivity increase according to the invention is achieved without disadvantages in terms of the width and shape of the (1.2.1) the solid-phase intermediate (IV) obtained and from stage (1.1) and (1.2.2) an aluminum compound (V) which is dissolved in an organic solvent and is of the formula $AlR_mX_{3-m}$, where X is a radical OR, chlorine, bromine or hydrogen, R is a $C_1$–$C_{18}$-hydrocarbon radical and m is from 1 to 3, are brought into contact with one another with formation of a suspension, with the proviso that the weight ratio of solid-phase intermediate (IV) to aluminum compound (V) is from 1:0.05 to 1:2, the resulting suspended substance being a solid-phase product (VI), (2) an organoaluminum catalyst component of the formula $AlR_mX_{3-m}$, where X is a radical OR, chlorine or hydrogen, R is a $C_1$–$C_{18}$-hydrocarbon radical and m is from 1 to 3, and (3) an organohalogen catalyst component with the provisos that the atomic ratio of transition metal from the catalyst component (1) to aluminum from the catalyst component (2) is from 1:0.1 to 1:500 and the molar ratio of organoaluminum catalyst component (2) to organohalogen catalyst component (3) is from 1:0.001 to 1:50, wherein the transition metal catalyst component (1) used is one prepared by a method in which (1.3) in addition (1.3.1) the solid-phase product (VI) obtained from stage (1.2), which may be in suspension in an inert hydrocarbon, and (1.3.2) oxygen are brought into contact with one another at from −25° to 100° C., for from 5 to 500 minutes, with the proviso that the atomic ratio of transition metal from the product (VI) to oxygen is from 1:0.01 to 1:10, the resulting solid-phase end product (VII) being the transition metal catalyst component (1).

2. The process of claim 1, wherein the solution (II) further includes (IIB3) from 1 to 400 molar parts of zirconium tetrahalide, where the halogen is chlorine and/or bromine.

* * * * *

UNITED STATES PATENT AND TRADEMARK OFFICE
CERTIFICATE OF CORRECTION

PATENT NO. : 4,831,090

DATED : May 16, 1989

INVENTOR(S) : Robert Bachl, Guido Funk, Kinrak Richter, Rainer Hemmerich, Roland Saive It is certified that error appears in the above-identified patent and that said Letters Patent is hereby corrected as shown below:

On The Title Page insert:

-- (30) Foreign Application Priority Data
Oct. 15, 1989  Fed. Rep. Germany .... 3635028 --

Signed and Sealed this

Tenth Day of October, 1989

*Attest:*

DONALD J. QUIGG

*Attesting Officer*   *Commissioner of Patents and Trademarks*